Patented Oct. 30, 1928.

1,689,762

UNITED STATES PATENT OFFICE.

ROGER ADAMS AND JAMES FRANKLIN HYDE, OF URBANA, ILLINOIS.

ORGANIC SOLVENT.

No Drawing. Application filed December 8, 1926. Serial No. 153,453.

This invention relates to organic solvents and more particularly to derivatives of phthalic acid in which one hydrogen of a carboxyl group is replaced by a substituted cyclohexyl group and the hydrogen of the other carboxyl by an alkyl group, and to a process for preparing the same.

In our copending application, "organic solvents", Serial No. 115,397, filed June 11, 1926, we have described the general class of compounds to which the substituted compounds forming the subject of our present application belong.

These compounds are high boiling liquids which dissolve the acetates and nitrates of cellulose very readily and can be used with other solvents in the preparation of pyroxylin and similar lacquers. Mixtures of these various esters are also very satisfactory as solvents.

Other and further aspects of this invention will be apparent from the disclosures in the specification and appended claims.

We have found that phthalic anhydride may be heated with one molecular equivalent of a substituted cyclo-hexanol, such as hexahydro p-cresol, and that the reaction takes place readily to give a substituted cyclohexyl acid phthalate. Although this product may be readily isolated before converting to a cyclohexyl alkyl phthalate it is not necessary to do so but merely to add to this reaction mixture an excess of any of a variety of alcohols in the presence of a little mineral acid, or certain types of organic acids, as a catalyst. The mixture is again heated for several hours, whereupon the cyclohexyl acid phthalate is converted into the substituted cyclohexyl alkyl phthalate. The pure substituted cyclohexyl alkyl phthalates are readily isolated from the reaction mixture.

The following equations represent the general reactions involved:

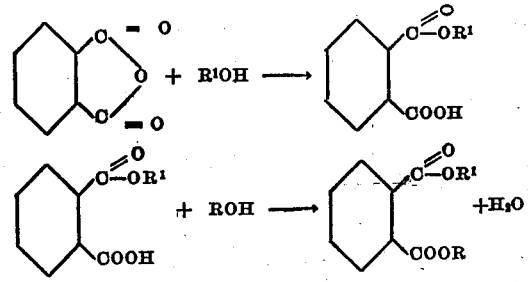

where R is an alkyl group and where R¹ is a substituted cyclohexyl group. The conditions of formation of these esters can be varied widely and the same products obtained.

Without limiting our invention to any particular precedure, the following example, in which parts by weight are given, will serve to illustrate our invention in the preferred form:

*p-Methyl cyclohexyl ethyl phthalate.*—A mixture of 46.5 grams of phthalic anhydride is mixed with 35.8 grams of p-methyl cyclohexanol and heated in an apparatus provided with a reflux condenser at 115°–125° C. for 8 to 12 hours. The reaction mixture may now be treated with sodium carbonate solution whereupon practically everything dissolves. Any small amount of insoluble material may be extracted with ether. Upon the acidification of the alkaline solution with hydrochloric acid, the substituted cyclohexyl acid phthalate separates.

It is not necessary, however, to isolate the substituted cyclohexyl acid phthalate as just described, but the reaction mixture, after the 8 to 12 hours heating, may be treated directly with 28.9 grams of ethyl alcohol, preferably absolute, which contains a few grams of hydrogen chloride, or sulfuric acid or benzene sulfonic acid or some other acid catalyst. This mixture is then heated at 75°–85° C. for 12 to 24 hours. The reaction mixture is subsequently heated until the excess of alcohol is removed (or it may be treated directly without removing the excess alcohol) and then washed with sodium carbonate solution, which extracts any unchanged substituted cyclohexyl acid phthalate. The portion insoluble in the sodium carbonate solution is then vacuum distilled. There is usually obtained a small amount of diethyl phthalate and a little substituted cyclohexanol as low boiling fractions and then the substituted (p-methyl) cyclohexyl ethyl phthalate distills practically constant. The formula for the p-methyl cyclohexyl ethyl phthalate is:—

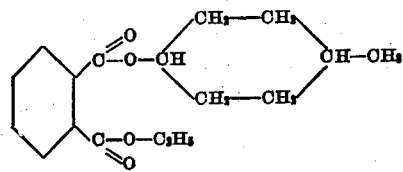

Other substituted cyclohexyl alkyl phthalates are prepared in an exactly analogous manner.

The p-methyl cyclohexyl ethyl phthalate boils at 160° C. at 3 mm. The meta-methyl cyclohexyl ethyl phthalate boils at 168° at 3.5 mm., the o-methyl cyclohexyl ethyl phthalate at 168° at 3.5 mm. The o-methyl cyclohexyl normal butyl phthalate boils at 185° C. at 3 mm. pressure, the meta-methyl cyclohexyl n-butyl phthalate at 178° at 2 mm., and the p-methyl cyclohexyl n-butyl phthalate at 183° at 2–2.5 mm. They are all colorless liquids, readily saponifiable with alkali to give the correspondingly substituted cyclohexanol, phthalic acid alkali salt, and the corresponding alcohol.

We are aware that many changes may be made, and numerous details of the process may be varied through a wide range without departing from the principles of this invention, and we therefore do not propose limiting the patent granted hereon, otherwise than necessitated by the prior art.

We claim as our invention:

1. As a new article of manufacture the compound of the general formula

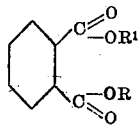

in which $R^1$ represents an alkyl substituted cyclohexyl group and R an alkyl group.

2. The method of preparing a methyl cyclohexyl ethyl phthalate which comprises heating phthalic anhydride with one molecular equivalent of a methyl cyclohexanol and then condensing the methyl cyclohexyl acid phthalate thus produced with ethyl alcohol in the presence of an acid as a catalyst.

3. The method of preparing alkyl substituted cyclohexyl alkyl phthalates of the general formula

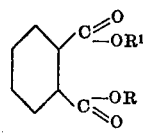

in which R represents an alkyl group and $R^1$ any type of alkyl substituted cyclohexyl group, which comprises reacting upon phthalic anhydride with an alkyl substituted cyclohexanol body and then treating the resulting product with an alcohol.

4. A solvent for cellulose esters, containing alkyl substituted cyclohexyl alkyl phthalates, as herein described.

5. As a new article of manufacture, a methyl substituted cyclohexyl alkyl phthalate.

6. As a new article of manufacture, a methyl cyclohexyl ethyl phthalate.

7. As a new article of manufacture, a product comprising pricipally p-methyl cyclohexyl ethyl phthalate, which is a colorless liquid having a boiling point of 160° C. at 3 mm. pressure.

In testimony whereof we have hereunto subscribed our names.

ROGER ADAMS.
J. FRANKLIN HYDE.